United States Patent
Kemmann et al.

(10) Patent No.: US 6,201,317 B1
(45) Date of Patent: Mar. 13, 2001

(54) DEVICE WITH A KEY-OPERATED LOCK CYLINDER AND WITH AN ELECTRICAL SWITCHING DEVICE, IN PARTICULAR AN ELECTRONIC LOCK FOR PREVENTING A VEHICLE FROM BEING DRIVEN AWAY

(75) Inventors: Harald Kemmann, Velbert; Jörg Simon; Alexander Reikher, both of Heiligenhaus, all of (DE)

(73) Assignee: Huf Hülsbeck & Furst GmbH & Co. KG, Velbert (DE)

(*) Notice: Subject to any disclaimer, the term of this patent is extended or adjusted under 35 U.S.C. 154(b) by 0 days.

(21) Appl. No.: 09/297,463
(22) PCT Filed: Oct. 29, 1997
(86) PCT No.: PCT/EP97/05955
  § 371 Date: Jun. 28, 1999
  § 102(e) Date: Jun. 28, 1999
(87) PCT Pub. No.: WO98/20221
  PCT Pub. Date: May 14, 1998

(30) Foreign Application Priority Data
  Nov. 5, 1996 (DE) .............................. 196 45 461

(51) Int. Cl.$^7$ ................................................ B60R 25/00
(52) U.S. Cl. .......................................... 307/10.2; 307/9.1
(58) Field of Search ................... 70/264, 276; 200/61.64, 200/61.85, 61.93; 307/9.1, 10.1, 10.2, 10.3, 10.6; 340/542, 547, 426, 825.31, 825.32

(56) References Cited

U.S. PATENT DOCUMENTS

| | | | |
|---|---|---|---|
| 4,326,124 | * 4/1982 | Faude | 235/382 |
| 4,737,785 | * 4/1988 | Zottnik | 340/825.31 |
| 4,901,053 | 2/1990 | Fukamachi et al. | |
| 5,455,571 | * 10/1995 | Janssen | 340/825.31 |
| 5,551,267 | 9/1996 | Janssen et al. | |

FOREIGN PATENT DOCUMENTS 195 47 304 A1   6/1996 (DE) .

* cited by examiner

Primary Examiner—Stephen W. Jackson
Assistant Examiner—Sharon Polk
(74) Attorney, Agent, or Firm—Friedrich Kueffner

(57) ABSTRACT

A device with a key-operated lock cylinder acts on a switching device as a function of the turning of a key. In addition to the key channel for holding the associated key and the tumblers, the cylinder core has a permanent magnet on its periphery. Similarly, in addition to a locking channel for the tumblers, the cylinder housing has at least one sensor which, when the cylinder core is actuated by the key, responds to the permanent magnet and activates the switching device via an evaluator. In order to secure the device against theft as a result of an unauthorized person replacing the cylinder core in the lock cylinder, an entire group of different cylinder cores is associated with the cylinder housing. They differ from one another with respect to at least one of their permanent magnets. In the device a given pair of cylinder core and cylinder housing is used as the lock cylinder which then has a given magnet code. When the lock cylinder is actuated by the key, the sensor detects the differences in the magnets. If the evaluator is programmed to a given magnet code, the evaluator responds only when the correct cylinder core corresponding to its magnet code is located in the lock cylinder when the lock Ls actuated by the key. If an unauthorized person replaces the cylinder core, the lock cylinder would have a different magnet code which cannot activate the device evaluator.

5 Claims, 2 Drawing Sheets

DEVICE WITH A KEY-OPERATED LOCK CYLINDER AND WITH AN ELECTRICAL SWITCHING DEVICE, IN PARTICULAR AN ELECTRONIC LOCK FOR PREVENTING A VEHICLE FROM BEING DRIVEN AWAY

BACKGROUND OF THE INVENTION

1. Field of the Invention

The invention pertains to a device wherein in the area of lock cylinders, both mechanical and electrical components are used, which, when a key is used to operate the lock, activate or deactivate electrical functions by way of the electrical switching device. The lock cylinder consists of a stationary cylinder housing with a rotatable cylinder core inside, which can be rotated by a properly fitting key. The mechanical components comprise a key channel which accepts the key, tumblers in the cylinder core, and a locking channel for the tumblers in the cylinder housing. The electrical components include at least one permanent magnet on the circumference of the cylinder core and a sensor in the cylinder housing, which, when the key is used to operate the cylinder core, responds to the permanent magnet. The sensor is connected to an evaluator, which activates the electrical switching device when the key operates the lock. The lock cylinder of a device such as this is preferably installed as a steering lock in the area of the steering column of a motor vehicle, and the electrical switching device contains the electronics of the engine. Devices of this type are used to protect the motor vehicle against theft. The device is then referred to as an "electronic device for preventing a vehicle from being driven away".

2. Description of the Related Art

A device such as this is known from U.S. Pat. No. 5,186,031. In this device, the vehicle is protected from theft even after the thief has pulled the cylinder core of the lock cylinder axially out of the cylinder housing in order to manipulate the interior of the cylinder housing. In this known device, the cylinder core has a radially spring-loaded retaining element, which, when the cylinder core is installed, snaps behind a shoulder on the housing. It is thus easy to install the cylinder core axially in the cylinder housing. When the cylinder core is torn out axially by the thief, the retaining element destroys the electrical connections of the sensor in the cylinder housing and thus makes the device inoperable. This anti-theft protection fails, however, when it is possible to use a break-in tool to move the spring-loaded retaining element into its release position with respect to the cylinder housing. In the case of devices in which the cylinder core is not connected to the cylinder housing by means of a snap-in attachment such as this, however, no anti-theft protection is present at all. The reason for this is as follows.

The anti-theft protection of vehicles equipped with these types of lock cylinders consists in that there are a large number of different lock cylinders, each of which has a different set of tumblers in the cylinder core. The cylinder core can thus be rotated only by a certain key which fits this cylinder core. Whereas the cylinder housing has a uniform design, there are many different keys, and each key fits only the corresponding, individual arrangement of tumblers in the cylinder core. To break open a lock equipped with a lock cylinder for which the proper key is not available, it is sufficient for the thief to tear out the cylinder core and replace it with a new cylinder core, for which he has the proper key. It makes no difference to the cylinder housing that the original cylinder core has been replaced by a new one for which the thief has the proper key. This theft strategy also functions in the case of the known device in which the cylinder core has a permanent magnet and the cylinder housing has a sensor, because the new cylinder core bought with the key also has a permanent magnet, which is then able to perform the same functions in the interior of the cylinder housing as the permanent magnet of the torn-out cylinder core. The known device thus does not offer adequate protection.

SUMMARY OF THE INVENTION

The invention is based on the task of developing a reliable device of the aforementioned kind, which is characterized by a high level of protection against manipulations of the lock cylinder by unauthorized persons. This is accomplished according to the invention by means of the following features:

- a group of different cylinder cores is assigned to the cylinder housing with a sensor in a predetermined, fixed location;
- where, although the cores have the same tumblers and can be actuated by the same key, they differ from each other magnetically with respect to one at least one of the permanent magnets;
- in that, for each application of the device, one cylinder core is selected from this group and paired with the cylinder housing to form a magnet-specific lock cylinder;
- which, because of the selected cylinder core, forms a lock cylinder with a specific magnetic code;
- in that the sensor detects the magnetic differences in the magnetic code upon operation of the cylinder core by the key;
- in that the evaluator can be set or programmed for the specific magnetic code of the lock cylinder used in the device; and
- in that, after this setting or programming, the evaluator will respond by actuating the switching device upon operation of the key only when the selected cylinder core upon which the magnetic code is based is in the lock cylinder.

The invention introduces a new variant of a lock cylinder for the known device. What is available now is a family of cylinder cores which differ from each other not only with respect to the arrangements of their tumblers, these cores requiring different keys, of course, but still being capable of working together with the same cylinder housing, but also with respect to their magnetic properties, which still allows them to be installed in the same cylinder housing. According to the invention, therefore, there are lock cylinders with identical housings which differ not only mechanically from each other on the basis of their key code but also electrically as a result of a "magnetic code". When, in the case of the device according to the invention, a thief tears out the cylinder core with its permanent magnet and replaces it with a new cylinder core also having a permanent magnet, he cannot circumvent the device according to the invention even though he has the right key. Because of the differences according to the invention between the permanent magnets of the various cylinder cores, the new lock cylinder assembled in this way will usually have a different magnetic code. This is detected by the sensor, which therefore will not actuate the evaluator when the key is used to operate the newly installed cylinder core. The evaluator in the invention is still set or programmed for the old code. The replacement of the cylinder core does not benefit the thief in any way when the device according to the invention is present; the sensor is able to tell that the cylinder core is "wrong". The electrical switching device is therefore not activated, and the attempted theft fails.

If it is possible not only to use the same number of permanent magnets but also to mount them at the same point on the individual cylinder cores, the device will be especially simple in its design and also inexpensive to manufacture, provided that the cylinder cores to be installed in a standard cylinder housing can still be made magnetically different from each other. In turns out that, to make them magnetically different from each other, it is sufficient to vary their field direction. This can be easily done at the time the permanent magnets are installed in the individual cylinders. Permanent magnets with a specific orientation of their north pole-south pole axis are used, and sensors which are able to detect the orientation of the magnetic field are provided. The number of different magnetic codes available depends only on the accuracy with which these sensors can distinguish between different magnetic field orientations. The selected rotational position of the permanent magnet at the time it is installed in the cylinder core determines the magnetic code. This is very easy to accomplish. As a result, the devices according to the invention can be manufactured at very low cost. In addition, the sensor is able to determine the orientation of a magnetic field with a surprisingly high degree of accuracy, and it is thus possible to differentiate a large number of magnetic codes effectively and reliably.

It is also advantageous to incorporate a locking bar such as that already familiar from the state of the art into the cylinder core of the device according to the invention by designing the locking bar itself as a permanent magnet. This bar thus no longer serves to provide only mechanical protection. The advantages which result from this measure are described further below.

BRIEF DESCRIPTION OF THE DRAWING

Additional measures can be derived from the drawings, and the following text. The invention is directed to all of the new features and combinations of features which can be derived from the claims, drawings, and text, even if they are not stated explicitly in the claims. An exemplary embodiment of the invention is illustrated schematically in the drawings:

DESCRIPTION OF THE PREFERRED EMBODIMENT

Figure 1:
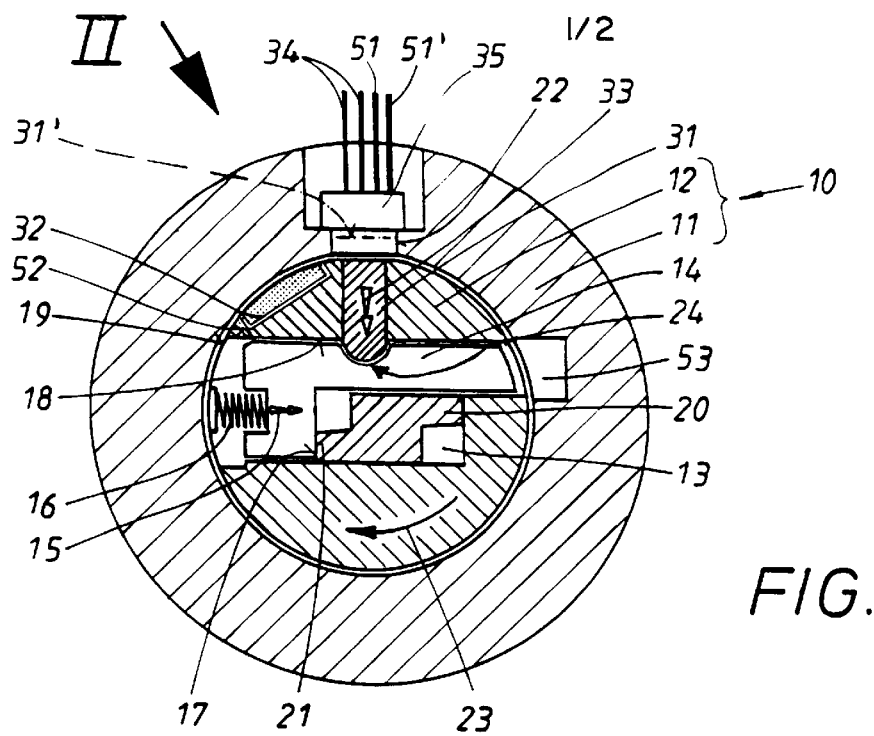
FIG. 1 shows a cross section through a lock cylinder of the device according to the invention along line I—I of FIG. 2.

Only the most essential parts of the device are shown in the drawings and are to be supplemented by additional standard components. A lock cylinder 10 is shown, which has a cylinder housing 11. The housing is installed permanently in, for example, a motor vehicle in the area of the steering column lock. The housing can be designed as a sleeve, the interior of which serves to hold the cylinder core 12, which is able to turn in the housing. Cylinder core 12 is the other part of lock cylinder 10, and it has a key channel 13 for a key 20. In addition, a family of tumblers 14 is integrated into cylinder core 12, these tumblers being pushed by springs toward key channel 13. This is illustrated by a force arrow 15 in FIG. 1. The elastic force proceeds from springs 16, indicated schematically. As long as key 20 is absent, tumblers 14 project into a locking channel 53 in cylinder housing 11. Key 20 has a suitable adjusting means 21, e.g., cutaway areas which create a certain profile. When the key is inserted, these means cooperate with complementary control surfaces 17 of the various tumblers 14. Thus tumblers 14 are disengaged from locking channel 53, as shown in FIG. 1.

A locking bar 31, which is able to move essentially in the radial direction, is provided in an axial recess in cylinder core 12. This bar is spring-loaded, as illustrated by force arrow 33 in FIG. 1. Spring loading 33 tries to the keep locking bar in its extended, lowered position shown in FIG. 1, but normally it is prevented from doing this by tumblers 14. If, for example, a properly fitting key 20 has not been fully inserted in key channel 13, tumblers 14 will assume a disordered configuration in cylinder core 12 because of their spring loading 15, and the inner end of locking bar 31 will be held back at various points along the longitudinal edges 18 of individual tumblers 14. As a result, the outer area of the locking bar projects radially beyond the circumference 19 of the cylinder, thus assuming position 31' illustrated in dash-dot line in FIG. 1. In this dash-dot position 31', the locking bar engages in a groove 22 in housing 11 and thus prevents the cylinder from turning, as illustrated by rotation arrow 23 in FIG. 1. Thus dash-dot position 31' of the bar represents its "locking position".

But when a properly fitting key 20 is inserted fully into cylinder core 12, the various tumblers 14 are then positioned in the interior of the cylinder core 12 by key faces 21 in such a way that lateral recesses 24 provided in the sides of the tumblers are all aligned with the inner edge of locking bar 31. In this situation, therefore, spring loading 33 can move the locking bar into aligned lateral recesses 24, the bar thus assumes its lowered, pulled-out position 31 shown in FIG. 1, in which its outer edge no longer projects beyond the circumference 19 of the cylinder. In this pulled-out position 31, therefore, locking bar 31 is no longer engaged in housing groove 22, for which reason this position 31 of the bar turns out to be its "release position". Now cylinder core 12 can be turned by inserted key 20 in the direction of arrow 23. Turning stops (not shown) prevent cylinder core 12 from being turned in a direction opposite that of rotation arrow 23.

In addition, pulse springs (not shown) or the like ensure that cylinder core 12 is always held in the starting rotational position as shown in FIG. 1 until key rotation 23 occurs. In this starting rotational position, the outer edge of the locking bar, which is normally in locking position 31', is aligned with a sensor 35, which responds to magnetic fields, this sensor being installed in cylinder housing 11.

This sensor can consist of a Hall-efffect device. It is recommended, however, that a so-called magneto-resistive element be used, which also responds to changes in direction of the magnetic field. This is described in greater detail below. Sensor 35 is lodged in an opening in housing 11 and is located in the space above housing groove 22, which cooperates in creating locking position 31'. In the present case, locking bar 31 is itself a permanent magnet. As an alternative, it would be possible for locking bar 31 to be made of a ferromagnetic material, which is acted upon by the magnetic field of a permanent magnet located at some other point in the cylinder core, as a result of which the bar itself can act as a magnet. As FIG. 2 shows, the axis of locking bar 31 is parallel to the axis of cylinder 12.

If it is desired to do without the monitoring function, described in greater detail below, which occurs when key 20 is inserted, it is also possible for locking bar 31 in a modification of the exemplary embodiment to be nonmagnetic. Thus, at least one additional permanent magnet 32 is provided in cylinder core 12, but this one, in contrast to magnetic locking bar 31, remains stationary on cylinder core 12.

Figure 2:
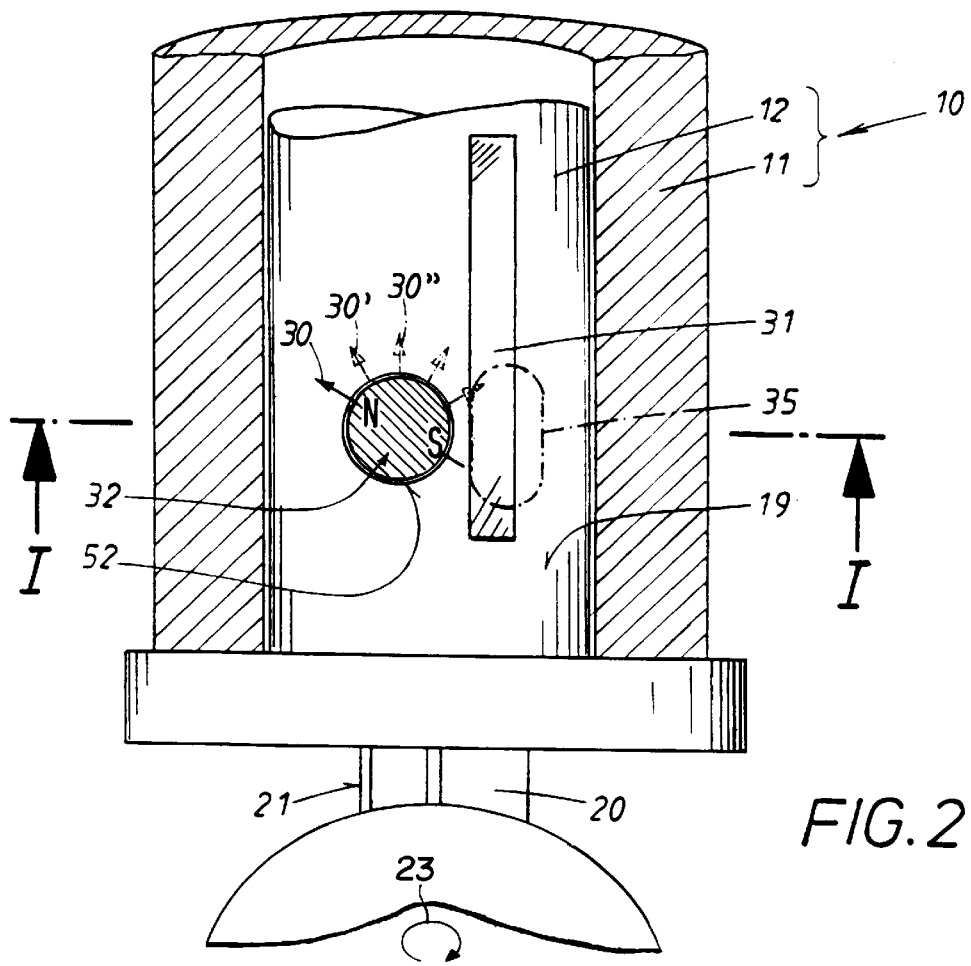
FIG. 2 shows a plan view of an axial section of the lock cylinder in the viewing direction of arrow II of FIG. 1 in a partial, longitudinal cross section.

In FIGS. 1 and 2, permanent magnet 32, shown shaded with dots, is located at a certain point on the circumference of cylinder core 12, which is offset with respect to locking bar 31. The orientation of the magnetic field of permanent magnet 32 is defined by its north pole N and its south pole S and is indicated by an arrow 30 in FIG. 2. Permanent magnet 32 is mounted in a hole 52 let into circumferential surface 19 of cylinder core 12. As suggested with dots, permanent magnet 32 could also be mounted in the same hole in cylinder core 12 so that its magnetic field assumes various other orientations 30', 30", etc., illustrated in dotted line. Sensor 35 is in a position where it can detect the orientation of the magnetic field, which will be explained in greater detail on the basis of FIG. 4.

Sensor 32, however, can also determine the field strength of a permanent magnet 32. As an alternative to the exemplary embodiment of FIGS. 1 and 2, it would therefore be possible to provide a bar of magnetizable material instead of permanent magnet 32. As in the case of locking bar 31 described above, this bar is acted upon by a magnet mounted a certain distance away in cylinder core 12. Like object 32 of the exemplary embodiment, this bar is mounted in a stationary manner in cylinder core 12; it therefore represents a fixed bar. In this alternative embodiment, differences in the magnetic behavior of a fixed bar such as this can be easily produced by varying its axial position, which is determined by sensor 35 when cylinder core 12 is subjected to rotation 23.

Distinctions between permanent magnets 32 as described above can therefore be achieved by changing their magnetic field strength instead of by changing the orientation of their magnetic fields. These changes, too, can be detected by sensor 35. Another method of creating differences between them could be to mount permanent magnet or magnets 32 on different parts of cylinder core 12, differences which sensor 35 would obviously be able to detect immediately. It would also be possible to provide more than one sensor 35 and to connect these sensors to a common electronic evaluator 40.

Figure 3:
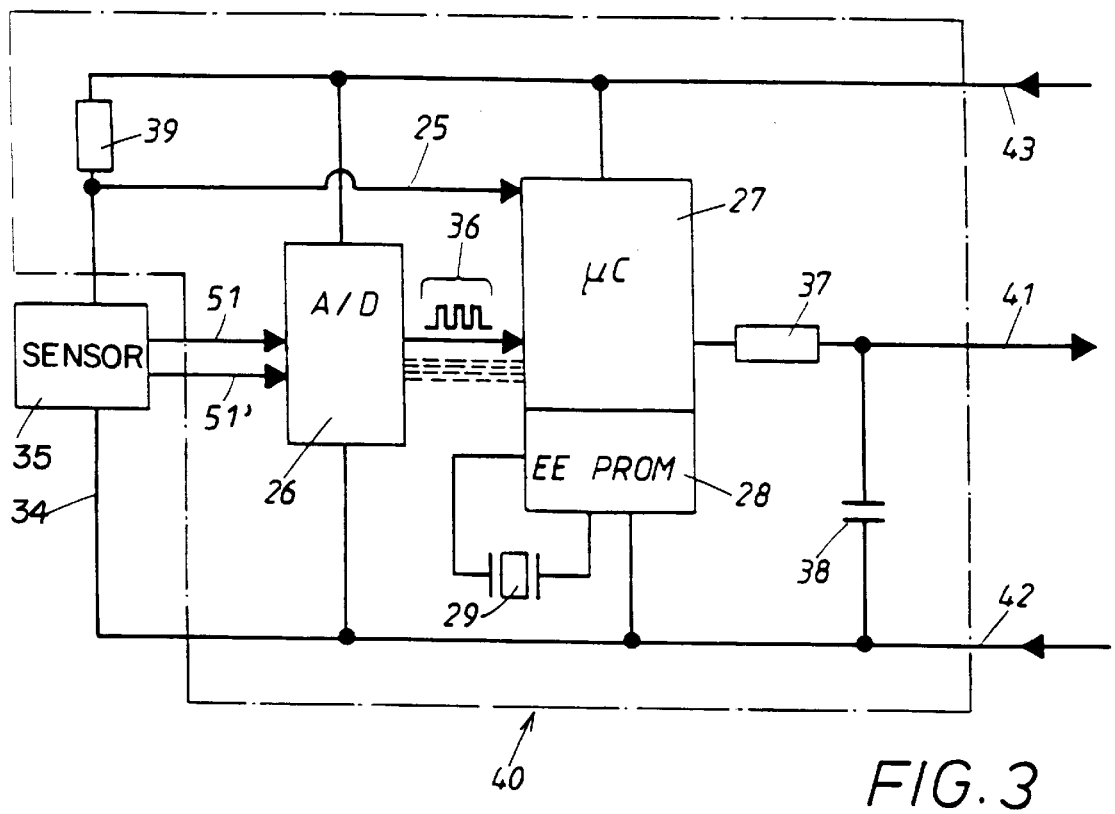
FIG. 3 shows a functional block diagram of the basic design of the evaluator according to the invention, which is connected to the sensor.
Figure 4:
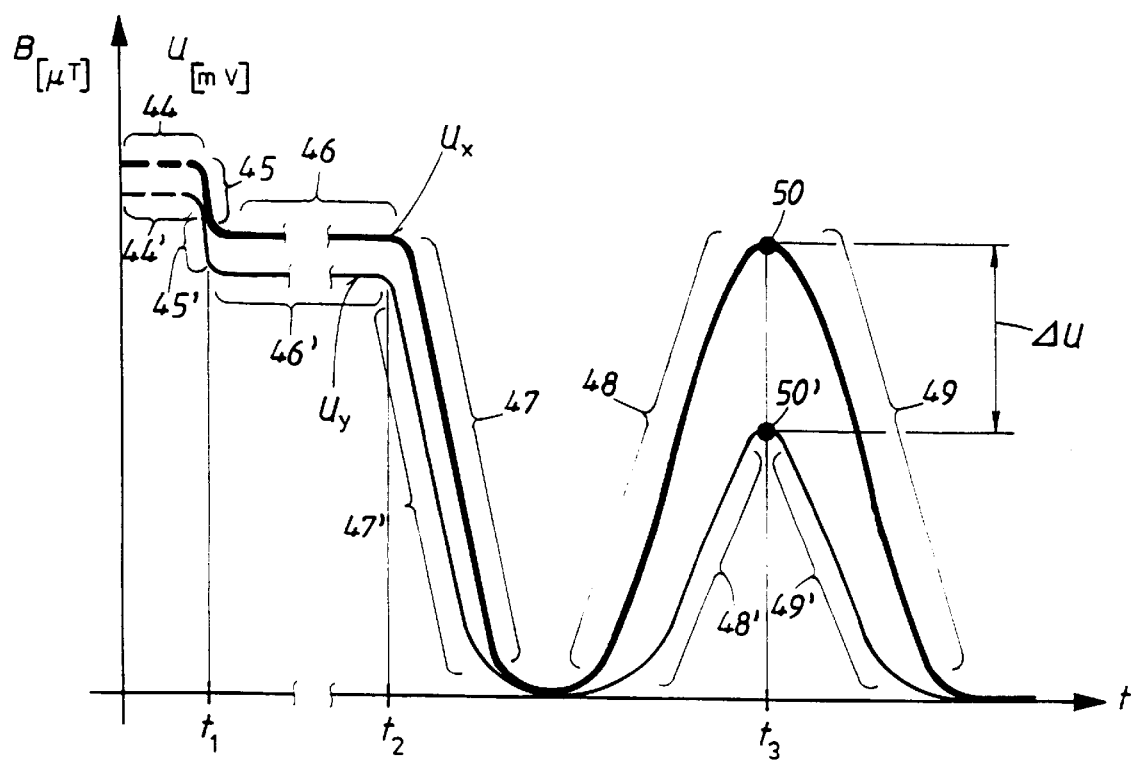
FIG. 4 shows a performance diagram of the sequence of magnetic field changes detected by the sensor and the resulting voltage input values sent to the evaluator when the key is inserted and the cylinder core is turned.

An exemplary embodiment of an evaluator 40 is explained in greater detail in FIGS. 3 and 4. Sensor 35 is connected by an electric power line 43, in which a series resistor 39 is inserted, and by a ground lead 42 to a voltage source (not shown) and has two signal lines 51, 51' for sending its measurement values. Sensor 35 can determine the exact orientation 30 of the magnetic field by measuring two field components which are perpendicular to each other, namely, Bx and By, as will be explained in greater detail on the basis of FIG. 4. An inverter (not shown) can be connected downline from the sensor if desired. Electrical voltages in the form of an analog signal are obtained first. These are converted in an A/D converter 26 to digital signals 36, which is indicated in FIG. 3. It would also be possible to use a comparator instead of this converter 26. Because of the Bx and By measurement of the magnetic field by way of the two signal lines 51, 51', two digital signals 36 are obtained in the present case. These signals 36 arrive as "input values" at a computer 27 (microcomputer), which is provided with a memory unit 28. This connection between 26 and 27 can also consist of a 4-bit or 8-bit parallel connection, as indicated by dashes in FIG. 3. In addition, sensor 35 is also connected directly by a wake-up line 25 to the microcomputer.

Memory 28 is an EEPROM (electrical erasable programmable read-only memory). Computer 27 and memory 28 have a clock 29. At the output from evaluator 40 [Note 6], a corresponding alternating-current signal is obtained, which is smoothed by a filter, illustrated by a resistor 37 and a capacitor 38. A certain direct-current signal is therefore obtained on line 41 leaving evaluator 40. In memory 28, evaluator 40 can be programmed for certain individual digital signals 36 of the two measurement components Bx and By. Evaluator 40 will then respond only when sensor 35 has identified these predetermined signals. Only in this case does evaluator 40 transmit a control signal on output line 41, which is connected to an electrical switching device (not shown), e.g., the electronics of the engine of a motor vehicle.

FIG. 4 illustrates the way in which the device according to the invention operates. Time is shown on the horizontal axis, and the values of the magnetic field strength Bx and By determined on-site by sensor 35 and also the voltage signals 36 obtained in evaluator 40 are shown on the vertical axis. Because of the two measurement components Bx and By, two voltages Ux and Uy, which are illustrated in FIG. 4 by lines of different thickness, are obtained in the present case in the evaluator. These are processed by computer 27 in the following way.

Initial segments 44, 44' of the two curves Ux, Uy shown in dashed line in FIG. 4 represent the original state of the device according to the invention, i.e., before the insertion of key 20. In the original rotational position of FIG. 1, sensor 35 detects the magnetic field generated by the locking bar in locking position 31', but this does not lead to the activation of evaluator 40. Sensor 35, as indicated by dash-dot lines in the cross-sectional view of FIG. 2, is at the point in cylinder housing 11 where locking bar 31 is located when cylinder core 12 is in its starting position. In this case, evaluator 40 is in an off or stand-by position. The motor vehicle equipped with the device according to the invention on the steering column lock is at a standstill. This changes, however, as soon as a properly fitting key 20 is inserted in cylinder core 12.

When the motor vehicle is to be started, key 20 must, of course, first be inserted into cylinder core 12. This happens at time t1 of the performance diagram of FIG. 4. As a result of the previously mentioned drop of the locking bar from its locking position 31' of FIG. 1 into its release position 31, the magnetic field detected by sensor 35 also decreases. This is illustrated in FIG. 4 by vertical curve segments 45, 45' for Ux and Uy. The evaluator 40 awakens only when change 45, 45' is within certain limiting values, which are programmed into memory unit 28. For this purpose, the previously mentioned wake-up line 25 is used, which connects sensor 35 directly to computer 27. A magnetic field change at 45, 45' lying outside these limiting values is not noticed by evaluator 40. If the rotation of key 20 does not begin immediately, more-or-less long horizontal curve segments 46, 46' for Ux and Uy follow.

Starting at time t2 in FIG. 4, cylinder core 12 is turned in direction 23. Magnetic locking bar 31 thus first moves away from sensor 35, for which reason the two curves have falling, curved segments 47, 47'. Then, however, permanent magnet 32 comes increasingly into the measuring range of sensor 35, which has the effect of making the two curves rise again at 48, 48'. When permanent magnet 32 reaches its closest position, the two curves Ux and Uy reach their corresponding maxima 50, 50'. This happens, according to FIG. 4, at time t3. Then, as cylinder core 12 continues to turn in direction 23, the curves again have falling segments 49, 49', because permanent magnet 32 is now moving farther away from sensor 35.

The criterion for the activation of evaluator 40 can be the difference ΔU, which is the difference between the two curves Ux and Uy at or near the two maxima 50, 50', for example. If a different cylinder core 12 is inserted into cylinder housing 11, the magnetic field orientation 30 of which is different, e.g., with orientation 30' or 30" of FIG. 2, from that of the magnetic field of permanent magnet 32 located at the same point, then the heights of the two maxima 50, 50' of FIG. 4 are changed to different values upon turning the key in direction 23. This has the result of producing a different voltage difference $\Delta U$. Memory unit 28 in evaluator 40, however, is programmed for certain values of $\Delta U$, for which reason, when cylinder cores 12 are exchanged, evaluator 40 is no longer activated. As a result, therefore, it is no longer possible to steal the motor vehicle. In addition to the mechanical coding between key 20 and cylinder core 12 in conjunction with locking bar 31, there is also, according to the invention, a magnetic coding. This magnetic code is determined in the exemplary embodiment by orientation 30, 30', or 30", etc., of the magnetic field of only a single permanent magnet 32, located at the same point on the cylinder core 12. Through the combination of a large number of such magnetically different cylinder cores 12 with a cylinder housing 11 of the same type, a correspondingly large number of lock cylinders 10 with different magnetic codes is obtained.

As already mentioned, locking bar 31 itself is designed as a permanent magnet in the exemplary embodiment, which can also be used to differentiate one magnetic code from another. The lengths of vertical curve segments 45, 45' which result when key 20 is inserted into cylinder core 12, or the difference between them, can be stored in memory unit 28 of evaluator 40. This itself can be used to turn on evaluator 40 as previously described. Specific magnetic codes can thus be obtained simply by providing the various locking bars 31 in a group of cylinder cores 12, which can be combined with a standard cylinder housing 11, with different magnetic properties. This magnetic code of locking bar 31 can be combined with the additional magnetic code resulting from the use of permanent magnet or magnets 32. As a result, a correspondingly large number of lock cylinders 10 which differ from each other magnetically is obtained.

What is claimed is:

1. Device with a key-operated lock cylinder (10) and with an electric switching device,
    wherein the electric switching device activates or deactivates certain electrical functions, in particular electronic anti-theft measures for a motor vehicle, as a function of the rotation of the key (23);
    wherein the lock cylinder (10) consists of a stationary cylinder housing (11) and a cylinder core (12), supported in the housing with freedom of rotation;
    wherein, in the interior of the cylinder core (12), in addition to tumblers (14) to prevent the core from turning in the cylinder housing (11), a key channel (13) is also provided to accept the key (20) which can unlock the cylinder core (12);
    wherein at least one permanent magnet (32) is mounted on the circumference (19) of the cylinder core (12);
    wherein, in the cylinder housing (11), in addition to at least one locking channel for the tumblers (14), at least one sensor (35) is also provided, which responds to the permanent magnet or magnets (32) on the cylinder core; and
    wherein the sensor (35) is connected to an evaluator (40), the sensor (35) responding by activating the switching device by way of the evaluator (40) when the lock is actuated by the key,
    wherein
    a group of different cylinder cores (12) is assigned to the cylinder housing (11) with a sensor (35) in a predetermined, fixed location;
    wherein, although the cores have the same tumblers (14) and can be actuated by the same key (20), they differ from each other magnetically with respect to one at least one of the permanent magnets (32);
    wherein, for each application of the device, one cylinder core (12) is selected from this group and paired with the cylinder housing (11) to form a magnet-specific lock cylinder (10), which, because of the selected cylinder core (12), forms a lock cylinder (10) with a specific magnetic code;
    wherein the sensor (35) detects the magnetic differences in the magnetic code upon operation of the cylinder core (12) by the key;
    wherein the evaluator (40) can be set or programmed for the specific magnetic code of the lock cylinder (10) used in the device; and
    wherein, after this setting or programming, the evaluator (40) will respond by actuating the switching device upon operation (23) of the key only when the selected cylinder core (12) upon which the magnetic code is based is in the lock cylinder (10).

2. Device according to claim 1, wherein, although the various cylinder cores (12) of a related group have the same number of permanent magnets (32),
    and the permanent magnets (32) in the individual cylinder cores (12) of this group are also mounted in the same locations (52),
    at least one of these permanent magnets (32) differs with respect to its field orientation (30) and/or with respect to its field strength from the analogous permanent magnets (32) of all the other cylinder cores (12) of this group.

3. Device according to claim 1, wherein, although the cylinder cores (12) of a related group have the same number of permanent magnets (32),
    at least one of them is in a position different from that of all the other cylinder cores (12) of this group.

4. Device according to claim 1, wherein the sensor (35) or sensors consist of a magnetoresistive element.

5. Device according to claim 1 with a radially movable locking bar (31) in the cylinder core (12), which bar, after the key (20) has been removed, is held in a locking position (31') projecting radially beyond the cylinder circumference (19), where it engages in a groove (22) provided in the cylinder housing and thus prevents rotation (23) of the core,
    but which arrives in a lowered release position when a properly fitting key (20) is inserted, in which position it disengages itself from the housing groove (22) and allows the key (20) to turn the cylinder (23),
    wherein
    the locking bar (31) is itself designed as a permanent magnet or is magnetizable, the sensor (35) being seated on the point of the cylinder housing (11) which is radially aligned with the locking bar (31) when the cylinder core (12) is located in the starting rotational position, which starting rotational position is the position in which the key (20) can be inserted and removed;
    and in that, as soon a properly fitting key (20) is inserted, the sensor (35) responds to the changes in the magnetic field (45, 45') which occur as a result of the lowering of the locking bar (31) out of its locking position (31') into its release position and which are set or programmed into the evaluator (40), the response consisting of the actuation of the evaluator (40).

* * * * *